United States Patent [19]
Shimazaki

[11] Patent Number: 5,090,412
[45] Date of Patent: Feb. 25, 1992

[54] ULTRASONIC DIAGNOSIS APPARATUS

[75] Inventor: Toru Shimazaki, Tokyo, Japan

[73] Assignee: Yokogawa Medical Systems, Limited, Tokyo, Japan

[21] Appl. No.: 465,166

[22] PCT Filed: Aug. 31, 1988

[86] PCT No.: PCT/JP88/00872
§ 371 Date: Feb. 27, 1990
§ 102(e) Date: Feb. 27, 1990

[87] PCT Pub. No.: WO89/01761
PCT Pub. Date: Sep. 3, 1989

[30] Foreign Application Priority Data

Aug. 31, 1987 [JP] Japan ............................ 62-217335
Aug. 31, 1987 [JP] Japan ............................ 62-217336

[51] Int. Cl.$^5$ ............................................... A61B 8/00
[52] U.S. Cl. ......................... 128/660.07; 128/660.06; 73/626
[58] Field of Search ............... 128/660.01, 660.07, 128/660.06, 661.04; 73/602, 603, 625, 626, 1 DV

[56] References Cited

U.S. PATENT DOCUMENTS

| | | | |
|---|---|---|---|
| 4,012,951 | 3/1977 | Kessler | 73/603 |
| 4,611,494 | 9/1986 | Uchiyama | 128/661.01 |
| 4,771,470 | 9/1988 | Geiser et al. | 128/661.04 |
| 4,790,321 | 12/1988 | Miwa et al. | 128/660.07 |
| 4,951,676 | 8/1990 | Collet-Billon | 128/660.01 |
| 4,982,339 | 1/1991 | Insana et al. | 73/602 |
| 5,000,183 | 3/1991 | Bonnefous | 128/660.01 |

Primary Examiner—Francis Jaworski
Assistant Examiner—George Manuel
Attorney, Agent, or Firm—Moonray Kojima

[57] ABSTRACT

The present invention for realizing an ultrasonic diagnosis apparatus for displaying a high-quality image having a smaller amount of speckle noise is characterized in that receiving signals of a plurality of sound rays each having a different directionality within a range of bearing resolution of an ultrasonic beam are subjected to correlation processing to determine a receiving signal for the portion of one sound ray, and an image is formed on the basis of receiving signals thus determined, thereby eliminating speckle noise. Correlation processing in its simplest form may be addition averaging processing.

5 Claims, 6 Drawing Sheets

ULTRASONIC DIAGNOSIS APPARATUS

DESCRIPTION

1. Technical Field

The present invention relates to an ultrasonic diagnosis apparatus for displaying a high-quality image having a smaller amount of speckle noise.

2. Background Art

An ultrasonic diagnosis apparatus is an apparatus in which ultrasonic pulses are applied to the interior of a subject's body, and a sectional image formed on the basis of reflected waves returning from the interior of the subject's body is displayed on an image display unit such as a cathode ray tube (CRT) display. In the image of such an ultrasonic diagnosis apparatus, noise called speckle noise appears in the pattern of a fabric or pear skin and thus deteriorates the picture quality. This noise occurs unavoidably due to the phasewise interference with reflected waves from scattering objects that are smaller than the wavelength of ultrasonic waves applied to the interior of the subject's body.

DISCLOSURE OF INVENTION

An object of the present invention is to realize an ultrasonic diagnosis apparatus for displaying a high-quality image having a smaller amount of speckle noise.

In accordance with the present invention, receiving signals of a plurality of sound rays each having a different directionality within a range of bearing resolution of an ultrasonic beam are subjected to correlation processing to determine a receiving signal for the portion of one sound ray, and an image is formed on the basis of receiving signals thus determined, thereby eliminating speckle noise. Correlation processing in its simplest form may be addition averaging processing.

BEST MODE FOR CARRYING OUT THE INVENTION

Figure 1:
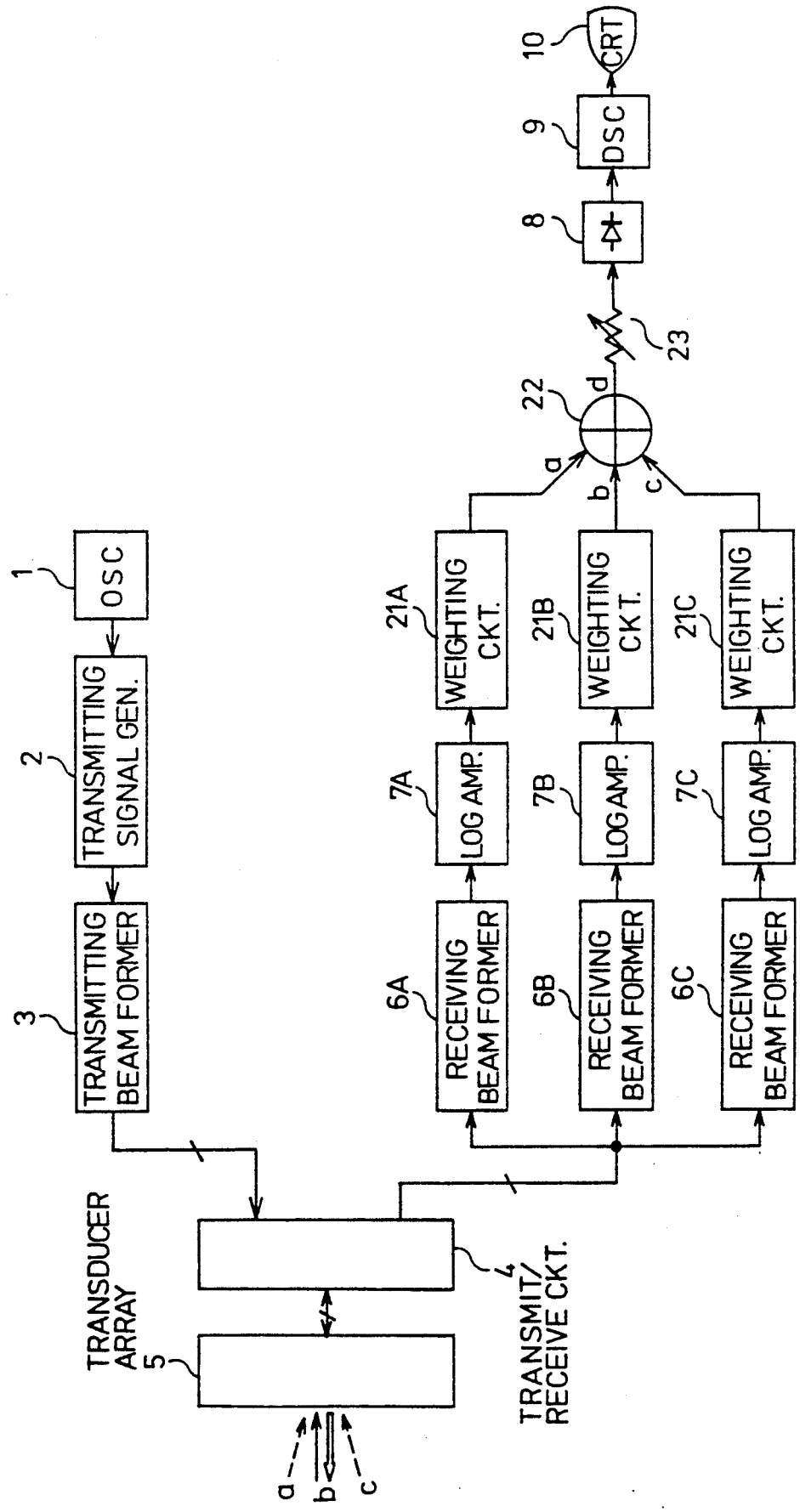
FIG. 1 is a block diagram of a configuration of an embodiment in accordance with the present invention.

First, referring now to FIG. 1, a description will be given of a first embodiment of the present invention. In FIG. 1, a high-frequency signal generated in a oscillator 1 is subjected to pulse modulation by a transmitting signal generator 2 and is input to a transmitting beam former 3. The transmitting beam former 3 generates a group of electric signals for forming a transmitting ultrasonic beam on the basis of the input high-frequency pulses. These electric signals are subjected to power amplification by a transmit/receive circuit 4 and is then sent to the interior of a subject s body. Ultrasonic waves reflected from a reflecting object located in the subject's body are received by a transducer array 5, are converted to a group of electric signals, and are simultaneously input to receiving beam formers 6A, 6B, 6C via the transmit/receive circuit 4. The receiving beam formers 6A, 6B, 6C are receiving beam formers which respectively synthesize three receiving beams on the basis of a group of receiving signals imparted from the transducer array 5. These three receiving beams are formed in such a manner that the difference between their directionality varies within a range of bearing resolution of the ultrasonic beam. Reference numerals 7A, 7B, 7C denote logarithmic amplifiers for amplifying output signals of the receiving beam formers 6A, 6B, 6C by subjecting them to logarithmic compression. Output signals of these logarithmic amplifiers 7A, 7B, 7C are multiplied by weighting coefficients by weighting circuits 21A, 21B, 21C, respectively, are then subjected to addition by an adder 22, and are converted to an output having an appropriate amplitude by an attenuator 23. The output signal of the attenuator 23 is subjected to envelope detection by a detector 8, is then converted to a signal of a television format by a digital scan converter 9, and is displayed on a CRT 10. The directions of transmission and reception of the ultrasonic beam are changed consecutively, and appropriate ultrasonic beam scanning, such as linear scanning or sector scanning, is effected.

Figure 2:
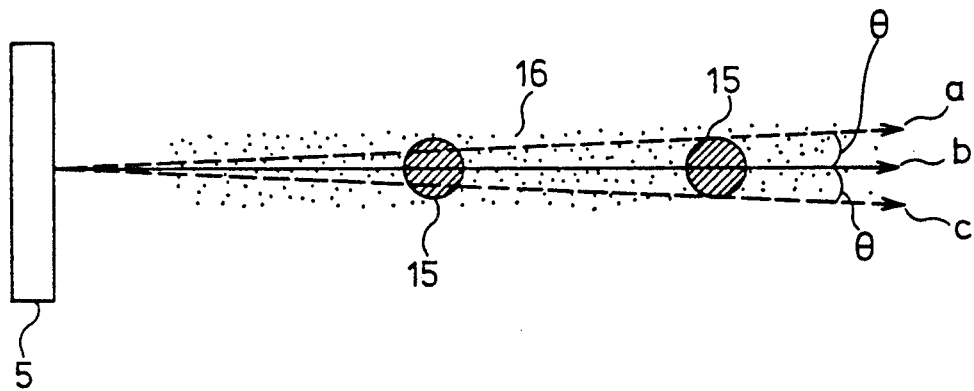
FIGS. 2, 3, 4A to 4E are explanatory diagrams of received signal processing in accordance with the embodiment of the invention.
Figure 3:
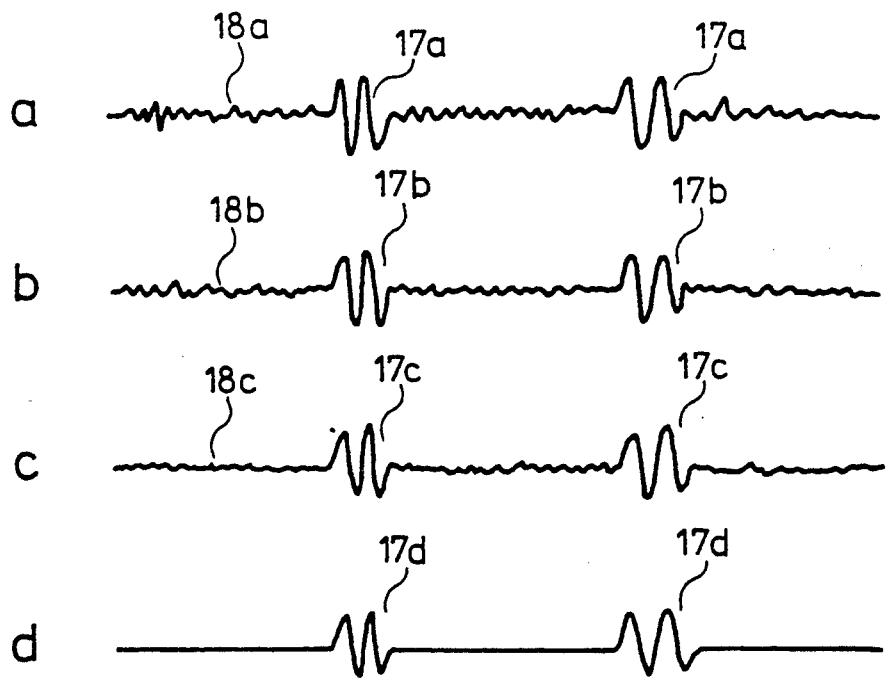

The three receiving beams received by the receiving beam formers 6A, 6B, 6C are formed as shown in FIG. 2, for example. In FIG. 2, reference numeral 15 denotes a pin target having a diameter corresponding to the bearing resolution of the ultrasonic beam, i.e., a minimum beam width; 16, a micro scattering object having a diameter smaller than wavelength of the ultrasonic wave, and corresponds to a parenchymal part of an organ's cell, for instance. Reference characters a, b, c denote sound rays of the three receiving beams each having a difference in directionality smaller than the diameter of the pin target 15. The receiving signals of the sound rays a, b, c are subjected to logarithmic compression and amplification by the logarithmic amplifiers 7A, 7B, 7C, and are weighted by weighting circuits 21A, 21B, 21C so as to be converted to high-frequency signals such as a, b, c shown in FIG. 3. In these signals, signal parts 17a, 17b, 17c are reflection signals from the pin target 15, while signal parts 18a, 18b. 18c are reflection signals from the micro scattering objects 16. Since the pin target 15 has a diameter corresponding to the bearing resolution of the ultrasonic beam, there are substantially large correlations in amplitude and phase between the signal parts 17a, 17b, 17c that are reflected signals thereof. In contrast, the signal parts 18a, 18b, 18c obtained by the micro scattering objects 16 display various speckle patterns due to interference with waves, and the traveling path of the receiving beam only deviates slightly and undergoes substantial change, so that there are no correlations. These receiving signals a, b, c are added by the adder 22, and since this addition is that of an output of the logarithmic amplifier, it follows that, with respect to the receiving signals, the signals of the respective sound rays are multiplied, so that this process is equivalent to establishing a correlation between the high-frequency signals of the three sound rays. Consequently, a receiving signal reflected from the micro scattering object 16 and having a very low correlation, i.e., a receiving signal such as d in which speckle noise is substantially eliminated, is obtained. This signal d is attenuated by the attenuator 23 so as to be converted to an output signal equivalent to an average value. In consequence, the signal from the pin target 15 is amplified by means of addition, and naturally irrelevant signals such as speckle noise and white noise are suppressed, so that a signal-to-noise ratio improves. In addition, since the speckle noise substantially, disappears, the picture quality is improved.

Figure 4A:
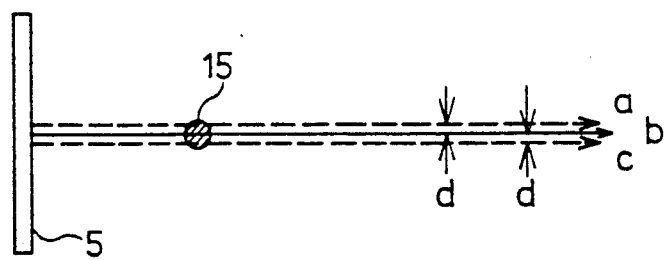
Figure 4B:
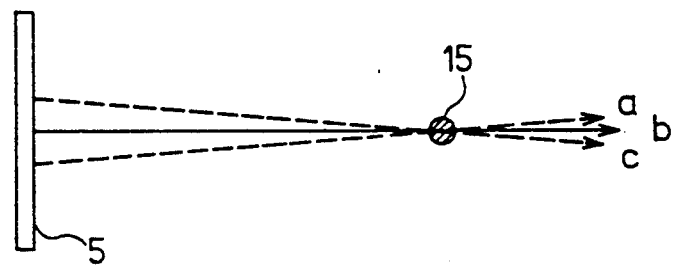
Figure 4C:
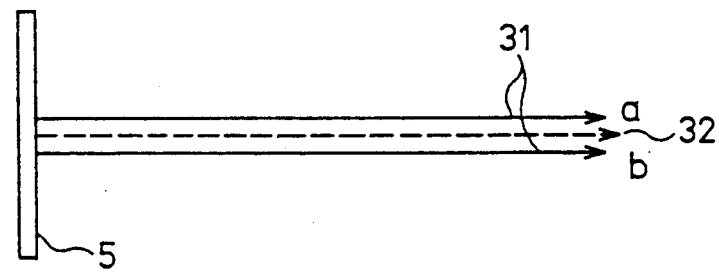
Figure 4D:
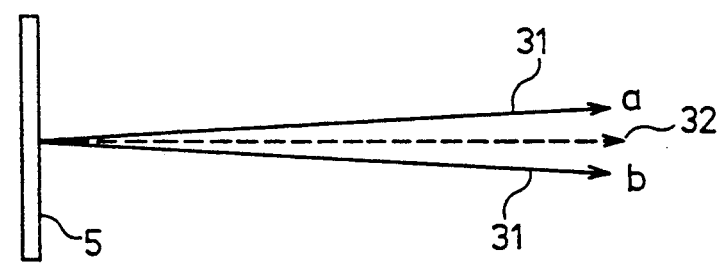
Figure 4E:
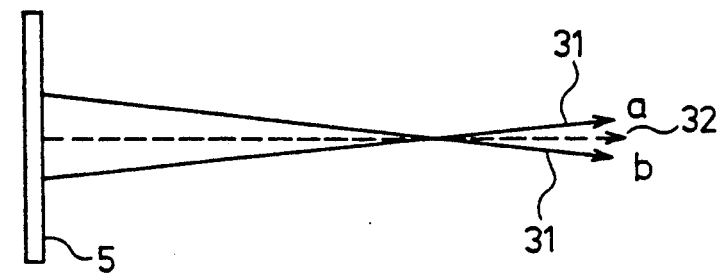

In addition to the above-described embodiment, the sound rays of the receiving beams may be formed as shown in FIGS. 4A to 4E. FIG. 4A slows a case in which receiving signals of parallel three sound rays are utilized, and FIG. 4B shows a case in which receiving signals of three sound rays which intersect each other at the position of the pin target 15. FIGS. 4C to 4E show cases in which receiving signals based on two sound rays 31 are made used of, in which FIG. 4C illustrates the case of mutually parallel two sound rays; FIG. 4D, the cause of two sound rays which diverge at very small angle's; and FIG. 4E, the case of two sound rays which intersect each other at very small angles. The number of the sound rays is arbitrary insofar as it is two or more. However, it is essential that the difference in their directionality be smaller than the bearing resolution of the ultrasonic beam. The number of the transducer elements of the transducer array for supplying a group of receiving signals to the respective receiving beam formers need not be strictly identical among the receiving beam formers. Although a greater effect is obtained if the added average is obtained after logarithmic compression, it is still possible to obtain a meritorious effect if the added average is obtained by means of the signal prior to the logarithmic compression.

Figure 5:
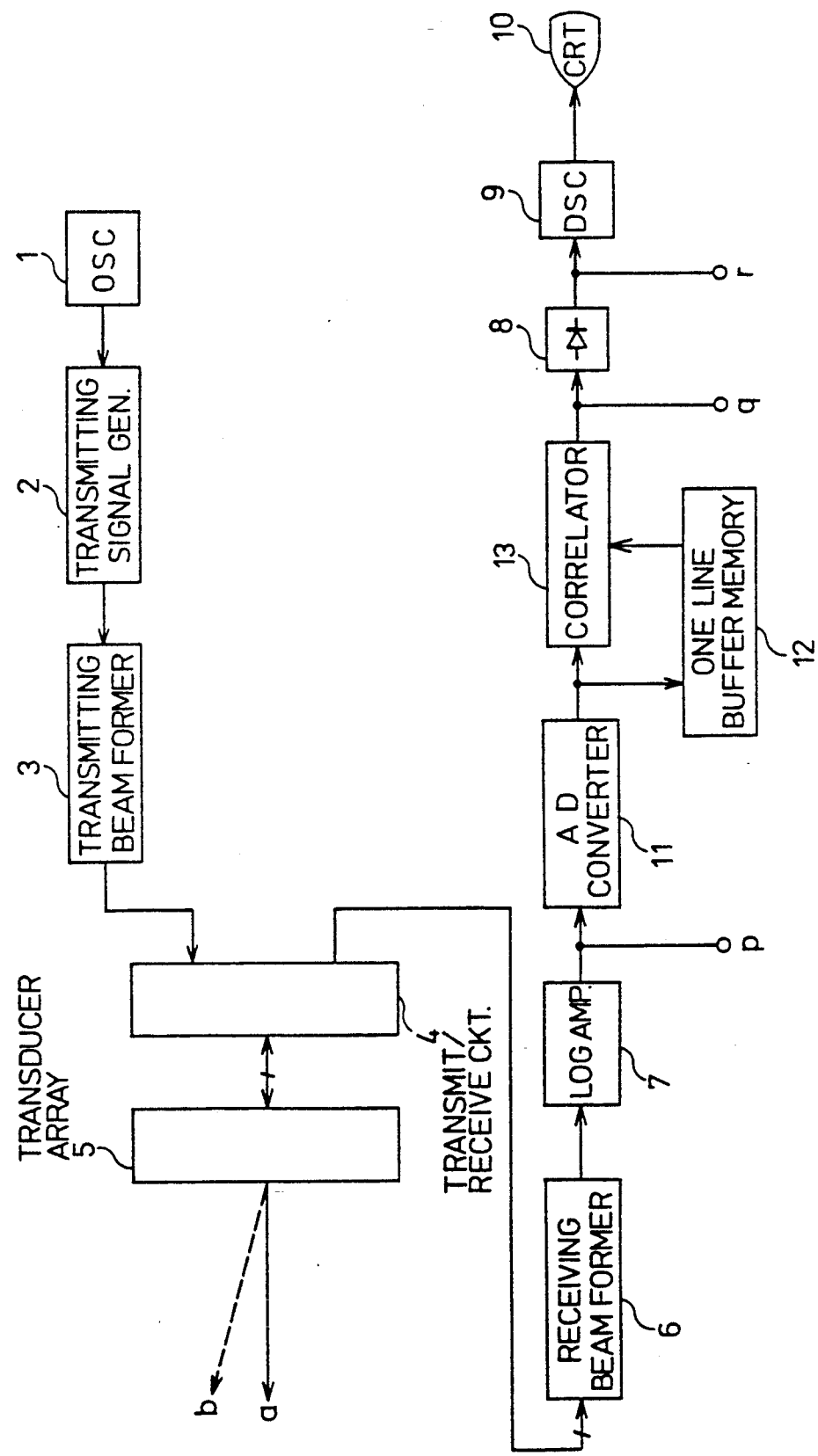
FIG. 5 is a block diagram of a configuration of another embodiment in accordance with the present invention.

FIG. 5 is a block diagram of another embodiment of the present invention, in which only one set of receiving beam formers are used to simplify the circuitry. In the drawing, components that are identical to those of FIG. 1 are denoted by the same reference numerals. In the drawing, reference numeral 11 denotes an AD converter for converting an analog signal to a digital signal, and its digital output signal is input to a one line buffer memory 12 for temporarily storing one-line data of the sound ray and is input to a correlator 13 as well. The correlator 13 determines a correlation between the immediately preceding sound ray data stored in the one line buffer memory 12 and the present sound ray data which is input from the AD converter 11. Here, it is possible to adopt an added average as the simplest operation for determining the correlation.

In the apparatus having the above-described configuration, the high-frequency signal generated by the oscillator 1 is subjected to pulse modulation by the transmitting signal generator 2, and an electric signal for a transmitting beam formed by the transmitting beam former 3 is imparted to the transducer array 5 via the transmit/receive circuit 4. In a first cycle of transmission and reception, the transducer array 5 transmits and receives an ultrasonic beam of, for example, the sound ray a, and in an ensuing cycle of transmission and reception transmits and receives an ultrasonic beam of the sound ray b having directionality different from that of the sound ray a within the range of bearing resolution of the ultrasonic beam. Subsequently, the transducer array 5 consecutively scans the interior of the subject's body by changing the directionality of the ultrasonic beam.

Reflected waves concerning the transmitting ultrasonic beam in the first cycle are received by the transducer array 5, are amplified by the transmit/receive circuit 4, and are formed as a receiving signal of the sound ray a by the receiving beam former 6. This receiving signal is subjected to logarithmic compression and amplification by the logarithmic amplifier 7, is converted to a digital signal by the AD converter 11, and is stored in the one line buffer memory 12 and is also input to the correlator 13. An ensuing reflected signal of the sound ray b is similarly received and processed, and its receiving signal is converted to a digital signal by the AD converter 11, and is input to the one line buffer memory 12 and the correlator 13. At this time, the correlator 13 determines a correlation between the input data of the sound ray b from the AD converter 11 and the receiving data of the sound ray a in the preceding cycle stored in the one line buffer memory 12. The resultant signal of this correlation calculation is subjected to envelope detection by the detection circuit 8, is converted to a signal of a television format by the DSC 9, and it then displayed on the CRT 10.

Figure 6A:
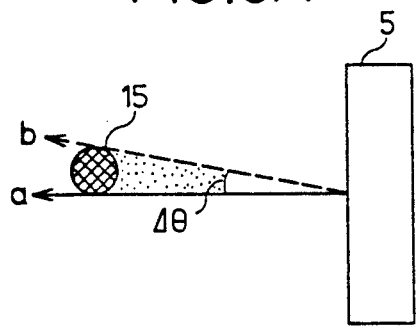
FIGS. 6A, 6B and 7 are explanatory diagrams of received signal processing in accordance with the another embodiment of the present invention.
Figure 6B:
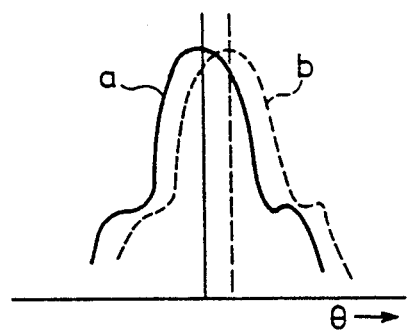
Figure 7:
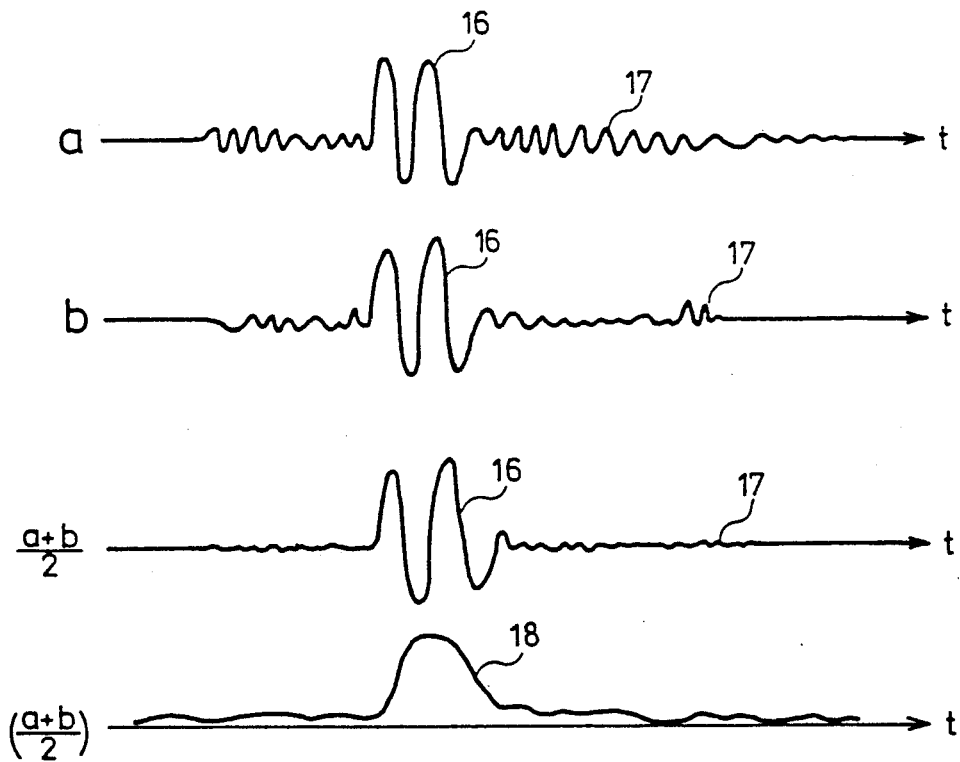

Processing of the receiving signal of the sound ray a and the receiving signal of the sound ray b at this juncture will be described with reference to FIGS. 6A, 6B and 7. In 6A, reference numeral 15 denotes the pin target having a diameter corresponding to the bearing resolution of the transmitting beam, and an angle $\Delta\theta$ between the sound ray a and the sound ray b is selected in such a manner as to become smaller than the angle of viewing the pin target 15. FIG. 6B illustrates a pattern of the ultrasonic beams of these sound rays a and b. FIG. 7 is a waveform diagram of the receiving signal, in which numeral 16 denotes a waveform of the reflected signal from the pin target 15, and numeral 17 denotes a speckle noise waveform caused by reflection from the micro scattering object. By subjecting the receiving signal of the sound ray a and the receiving signal of the sound ray b to correlation processing (addition averaging), it is possible to obtain a receiving signal $(a+b)/2$ in which the speckle noise 17 is reduced for the same reason as the one described in the preceding embodiment. Then, by subjecting this signal to envelope detection by the detection circuit 8, it is possible to obtain a receiving signal such as the one shown at the end in FIG. 7. It should be noted that the detection circuit 8 is not confined to one for effecting envelope detection.

Figure 8:
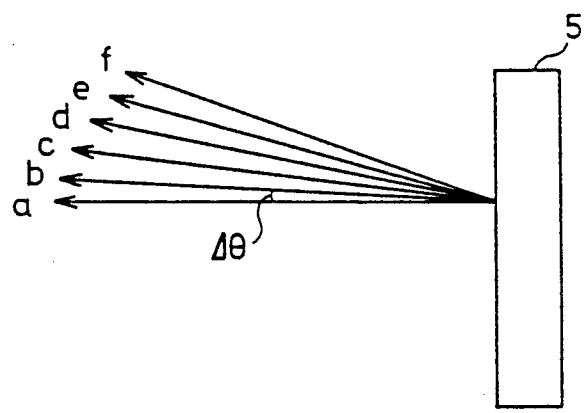
FIGS. 8 and 9 are diagrams illustrating sequences of received-signal processing in accordance with the another embodiment of the present invention.
Figure 9:
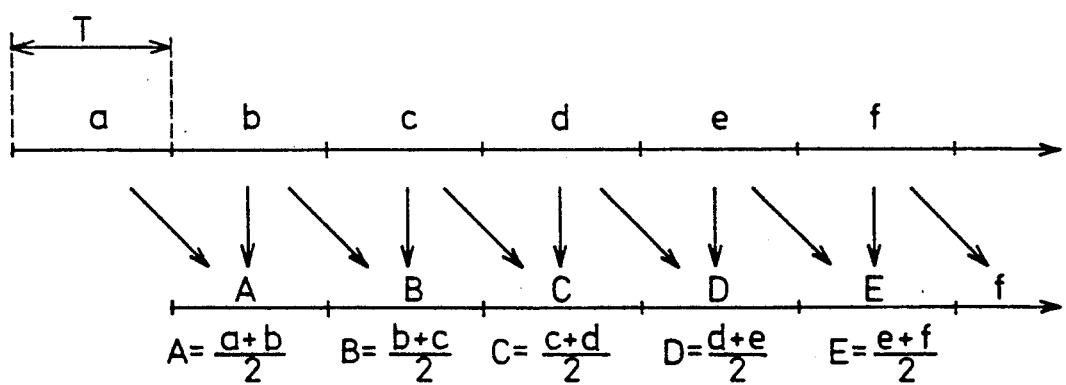

FIGS. 8 and 9 illustrate sequences for signal processing accompanying the progress of scanning with the ultrasonic beam. FIG. 8 illustrates sound rays that are consecutively transmitted and received by the transducer 5. FIG. 9 is a diagram illustrating a state of processing reflected signals by means of the respective sound rays, and shows that the receiving signals of the respective sound rays are consecutively subjected to correlation processing with the receiving signal of the immediately preceding cycle. If a plurality of one line buffer memories are used, it is possible to effect correlation processing and the like with respect to multiple sound rays. The correlator is not confined to the one for effecting simple addition averaging, but a one for effecting weighted addition. If a correlator whose correlation function varies in correspondence with a depth of a reflecting point of the ultrasonic wave is used as this correlator, the speckle noise eliminating effect further improves.

As described above, an explanation has been given of the best mode for carrying out the invention, it is readily possible for those having common knowledge in the field of art to which the present invention belongs to make various modifications without departing from scope of the appended claims.

What is claimed is:

1. In an ultrasonic diagnostic apparatus comprising means for scanning the interior of a subject's body with a plurality of beams, each of said beams comprising ultrasonic pulses; and means for receiving echo signals returning from the subject's body with respect to various sound rays of said ultrasonic, pulses, the improvement comprising means for determining a receiving signal for a portion of one of said sound rays by effecting a correlation process on the echo signals of said plurality of ultrasonic pulses each having a difference in directionality within a rang of bearing resolution of the respective ultrasonic beam; and means for forming a sectional image of the subject's body on the basis of the receiving echo signal of the respective sound ray thus determined, whereby speckle noise is eliminated from the sectional image.

2. The apparatus of claim 1, wherein said means for determining comprises a plurality of receiving beam forming means for respectively forming a plurality of receiving ultrasonic beams each having a difference in directionality within the range of bearing resolution of the respective ultrasonic beam, and correlation mans for subjecting a receiving ultrasonic beam from said plurality of receiving beam forming means to correlation processing.

3. The apparatus of claim 2, wherein said correlation means comprises a plurality of logarithmic amplification means for respectively subjecting output signals from said plurality of receiving beam forming means to logarithmic amplification; and weighted addition means for subjecting output signals from said logarithmic amplification means to weighted addition.

4. The apparatus of claim 1, wherein said means for determining comprises means for effecting correlation processing of consecutive ones of said echo signals.

5. The apparatus of claim 1, wherein said means for determining comprises buffer memory means for temporarily storing consecutive ones of said echo signals; and correlation means for effecting correlation between an echo signal currently being received in said buffer memory means and another of said echo signals previously stored in said buffer memory means.

* * * * *